US008628232B2

(12) United States Patent
Hassan et al.

(10) Patent No.: US 8,628,232 B2
(45) Date of Patent: *Jan. 14, 2014

(54) SYSTEM AND PROCESS FOR INHIBITOR INJECTION

(71) Applicant: H R D Corporation, Sugar Land, TX (US)

(72) Inventors: Abbas Hassan, Sugar Land, TX (US); Ebrahim Bagherzadeh, Houston, TX (US); Rayford G. Anthony, College Station, TX (US); Gregory G. Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,734

(22) Filed: Apr. 25, 2013

(65) Prior Publication Data

US 2013/0233544 A1 Sep. 12, 2013

Related U.S. Application Data

(63) Continuation of application No. 13/560,457, filed on Jul. 27, 2012, now Pat. No. 8,465,198, which is a continuation of application No. 12/142,544, filed on Jun. 19, 2008, now Pat. No. 8,282,266.

(60) Provisional application No. 60/946,463, filed on Jun. 27, 2007.

(51) Int. Cl.
*B01F 3/04* (2006.01)
*B01F 7/00* (2006.01)

(52) U.S. Cl.
USPC ............... 366/155.1; 366/155.2; 366/304; 516/923; 516/929

(58) Field of Classification Search
USPC ......... 366/164.6, 155.2, 155.1, 304; 516/922, 516/923, 929
See application file for complete search history.

(56) References Cited

U.S. PATENT DOCUMENTS 1,992,938 A 3/1935 Chambers et al.
2,256,694 A 9/1941 Tuttle
(Continued)

FOREIGN PATENT DOCUMENTS

JP 11057457 A 3/1999
JP 2004302310 A 10/2004
(Continued)

OTHER PUBLICATIONS

Ika-Rotor-Stator Generators—2003 Processing Catalog (38 pgs.).
(Continued)

*Primary Examiner* — Tony G Soohoo
(74) *Attorney, Agent, or Firm* — Timothy S. Westby; Porter Hedges LLP

(57) ABSTRACT

A method for introducing inhibitor into a fluid to be treated by forming a dispersion comprising droplets, particles, or gas bubbles of inhibitor dispersed in a continuous phase of a carrier, wherein forming the dispersion comprises subjecting a mixture of the inhibitor and the carrier to a shear rate of greater than about 20,000 $s^{-1}$ in a high shear device comprising at least one generator comprising a rotor and a complementarily-shaped stator, wherein the rotor and the stator each comprise grooves, and wherein the grooves of the stator and the grooves of the rotor of each generator are disposed in alternating directions, and using at least a portion of the dispersion to inhibit corrosion.

17 Claims, 2 Drawing Sheets

(56) References Cited

U.S. PATENT DOCUMENTS

| | | | |
|---|---|---|---|
| 2,321,599 A | 6/1943 | Hofmann | |
| 2,639,901 A | 5/1953 | Teale | |
| 2,960,318 A | 11/1960 | Eugene | |
| 3,639,282 A | 2/1972 | Sharman | |
| 3,685,734 A | 8/1972 | Paciorek et al. | |
| 3,815,835 A | 6/1974 | Apostol et al. | |
| 3,887,167 A | 6/1975 | Irwin | |
| 4,136,971 A | 1/1979 | Varlamov et al. | |
| 4,146,243 A | 3/1979 | Sims | |
| 4,231,666 A * | 11/1980 | Baron | 366/304 |
| 4,361,414 A | 11/1982 | Nemes et al. | |
| 4,511,256 A | 4/1985 | Karg et al. | |
| 4,515,704 A | 5/1985 | Akred et al. | |
| 4,630,556 A | 12/1986 | Scheffee | |
| 4,664,842 A | 5/1987 | Knudson, Jr. et al. | |
| 4,810,775 A | 3/1989 | Bendix et al. | |
| 4,812,445 A | 3/1989 | Eden et al. | |
| 4,814,376 A | 3/1989 | Tanaka et al. | |
| 4,915,509 A | 4/1990 | Sauer et al. | |
| 5,110,443 A | 5/1992 | Gregoli et al. | |
| 5,188,090 A | 2/1993 | Griggs | |
| 5,188,179 A | 2/1993 | Gay et al. | |
| 5,326,484 A | 7/1994 | Nakashima et al. | |
| 5,492,648 A | 2/1996 | Lau et al. | |
| 5,522,553 A | 6/1996 | LeClair et al. | |
| 5,538,191 A | 7/1996 | Holl | |
| 5,563,189 A | 10/1996 | Hosokawa et al. | |
| 5,665,796 A | 9/1997 | Hosokawa et al. | |
| 5,741,850 A | 4/1998 | Hosokawa et al. | |
| 5,824,279 A | 10/1998 | Richmond et al. | |
| 5,851,429 A | 12/1998 | Magyar | |
| 5,877,350 A | 3/1999 | Langer et al. | |
| 5,931,579 A | 8/1999 | Gallus et al. | |
| 5,931,771 A | 8/1999 | Kozyuk | |
| 5,961,885 A | 10/1999 | Eaton et al. | |
| 6,238,082 B1 | 5/2001 | Takemura | |
| 6,368,366 B1 | 4/2002 | Langer et al. | |
| 6,368,367 B1 | 4/2002 | Langer et al. | |
| 6,383,237 B1 | 5/2002 | Langer et al. | |
| 6,506,245 B1 | 1/2003 | Kinney et al. | |
| 6,530,964 B2 | 3/2003 | Langer et al. | |
| 6,613,720 B1 | 9/2003 | Feraud et al. | |
| 6,627,784 B2 | 9/2003 | Hudson et al. | |
| 6,649,571 B1 | 11/2003 | Morgan | |
| 6,742,774 B2 | 6/2004 | Holl | |
| 6,752,529 B2 | 6/2004 | Holl | |
| 6,780,948 B2 | 8/2004 | Rachita et al. | |
| 6,809,169 B2 | 10/2004 | Byrd et al. | |
| 6,866,411 B1 | 3/2005 | Stelzer et al. | |
| 6,939,832 B2 | 9/2005 | Collins | |
| 7,109,268 B2 | 9/2006 | Creutz et al. | |
| 7,148,183 B2 | 12/2006 | Quintero | |
| 7,165,881 B2 | 1/2007 | Holl | |
| 7,252,920 B2 | 8/2007 | Kurokawa et al. | |
| 7,287,899 B2 | 10/2007 | Navarro et al. | |
| 7,417,010 B2 | 8/2008 | Collins | |
| 7,419,938 B2 | 9/2008 | Collins | |
| 7,479,576 B1 | 1/2009 | Hassan et al. | |
| 7,481,273 B2 | 1/2009 | Javora et al. | |
| 7,511,079 B2 | 3/2009 | Kipp et al. | |
| 7,538,237 B2 | 5/2009 | Holl | |
| 7,553,903 B2 | 6/2009 | Riegel et al. | |
| 7,575,728 B2 | 8/2009 | Holl et al. | |
| 7,807,112 B2 | 10/2010 | Denes et al. | |
| 7,814,980 B2 | 10/2010 | Bryant et al. | |
| 7,842,184 B2 | 11/2010 | Hassan et al. | |
| 7,850,771 B2 | 12/2010 | Cui et al. | |
| 7,884,250 B2 | 2/2011 | Hassan et al. | |
| 7,888,535 B2 | 2/2011 | Hassan et al. | |
| 7,919,534 B2 | 4/2011 | Wood et al. | |
| 7,922,900 B2 | 4/2011 | Hassan et al. | |
| 8,006,760 B2 | 8/2011 | Fleming et al. | |
| 8,022,153 B2 | 9/2011 | Hassan et al. | |
| 8,053,075 B2 | 11/2011 | Schall et al. | |
| 8,071,046 B2 | 12/2011 | Hassan et al. | |
| 8,079,752 B2 | 12/2011 | Rausch et al. | |
| 8,080,684 B2 | 12/2011 | Hassan et al. | |
| 8,133,447 B2 | 3/2012 | Hassan et al. | |
| 8,147,768 B2 | 4/2012 | Hassan et al. | |
| 8,153,076 B2 | 4/2012 | Hassan et al. | |
| 8,153,077 B2 | 4/2012 | Hassan et al. | |
| 8,282,266 B2 * | 10/2012 | Hassan et al. | 366/155.1 |
| 8,465,198 B2 * | 6/2013 | Hassan et al. | 366/155.1 |
| 2004/0187770 A1 | 9/2004 | Calabrese et al. | |
| 2005/0014083 A1 | 1/2005 | Thaker | |
| 2006/0166838 A1 | 7/2006 | Collins et al. | |
| 2007/0055073 A1 | 3/2007 | McGurk | |
| 2008/0193520 A1 | 8/2008 | Moschwitzer et al. | |
| 2009/0000986 A1 | 1/2009 | Hassan et al. | |
| 2009/0005552 A1 | 1/2009 | Hassan et al. | |
| 2009/0005553 A1 | 1/2009 | Hassan et al. | |
| 2009/0005619 A1 | 1/2009 | Hassan et al. | |
| 2009/0005622 A1 | 1/2009 | Hassan et al. | |
| 2009/0005625 A1 | 1/2009 | Hassan et al. | |
| 2009/0209679 A1 | 8/2009 | Dreher et al. | |

FOREIGN PATENT DOCUMENTS

| | | |
|---|---|---|
| JP | 2005528978 A | 9/2005 |
| WO | 02042360 A2 | 5/2002 |
| WO | 02064708 A2 | 8/2002 |

OTHER PUBLICATIONS

Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15 pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
Office Action dated Dec. 5, 2011 for corresponding U.S. Appl. No. 12/142,544 (9 pgs.).
Office Action dated Apr. 12, 2011 for corresponding U.S. Appl. No. 12/142,544 (12 pgs.).
Search Report for corresponding International Application No. PCT/US2008/068163 dated Jan. 14, 2008 (8 pgs.).

(56) References Cited

OTHER PUBLICATIONS

Office Action dated Jan. 30, 2013 for corresponding U.S. Appl. No. 13/560,457 (10 pgs.).

Notice of Allowance dated Sep. 5, 2012 for corresponding U.S. Appl. No. 12/142,544 (5 pgs.).

IKA-DRS Reactors website http://www.ikausa.com/dr.him, on Sep. 8, 2010 (2 pgs.).

IKA, "Introduction to IKA's Three Stage Dispax Reactor," Retrieved from <http://www.ikausa.com/pdfs/process/dr%202000-Homogenizing-Dispersing-Suspending-Emulsifying.pdf> on Aug. 22, 2012 (12 pgs.).

Office Action dated Jun. 19, 2012 for corresponding U.S. Appl. No. 13/253,002 (10 pgs.).

Office Action dated Oct. 23, 2013 for U.S. Appl. No. 13/253,002 (17 pgs.).

\* cited by examiner

SYSTEM AND PROCESS FOR INHIBITOR INJECTION

CROSS-REFERENCE TO RELATED APPLICATIONS

This application is a continuation application of U.S. Ser. No. 13/560,457 filed on Jul. 27, 2012 (now U.S. Pat. No. 8,465,198, issued Jun. 18, 2013), which application is a continuation application of U.S. Ser. No. 12/142,544 filed on Jun. 19, 2008 (now U.S. Pat. No. 8,282,266, issued Oct. 9, 2012), which application claims the benefit under 35 U.S.C. §119(e) of U.S. Provisional Patent Application No. 60/946,463 filed Jun. 27, 2007. The disclosure of each application is hereby incorporated herein by reference in its entirety.

STATEMENT REGARDING FEDERALLY SPONSORED RESEARCH OR DEVELOPMENT

Not Applicable.

TECHNICAL FIELD

The present invention relates generally to inhibitor injection. More particularly, the present invention relates to a system and process for inhibitor injection comprising high shear dispersing.

BACKGROUND

An inhibitor is a chemical agent added to a fluid system to inhibit or prevent an undesirable reaction from occurring within the fluid or with the materials present in the surrounding environment. Numerous inhibitors are used in the petroleum, petrochemical, and chemical industries. For example, corrosion is recognized as a serious problem in the development of geoenergy sources, including oil and natural gas reserves, geothermal, and geopressured systems and leads to great costs to the industry every year. Corrosion problems are greatly aggravated by the presence of acid gases such as hydrogen sulfide and carbon dioxide, and by the co-production of brine solutions. As an alternative to the use of high alloy components which are expensive in relation to common carbon steels, a range of corrosion inhibitors have been researched for mitigating the occurrence of corrosion in the production and servicing of oil and gas wells. The use of inhibitors may permit the use of regular carbon steel components rather than more expensive alloys. Corrosion inhibitors are injected into process streams (for example in acidizing treatments) to inhibit corrosion of metal equipment and wellbore components and are generally carried in liquid steams to contact inner surfaces and other contact surfaces of plant equipment. A corrosion inhibitor may create a protective film or passivation layer on a metal surface and thus inhibit corrosion by acidic components in a process stream. For example, drill pipe may be coated with amine film to arrest corrosion of the pipe on contact with air.

Corrosion problems may be greater when production from deeper formations is pursued. Production of deep, sour gas reserves and deep geopressured zones may involve high bottom hole temperatures (as high as 200° C.) and pressures (up to 140 MPa). Additionally, the produced gas may contain primarily acid gases such as carbon dioxide and hydrogen sulfide and minor amounts (as low as about 20%) of desired hydrocarbon such as methane. The acid gases may be present along with high salinity sodium chloride brine in the producing formations, with chloride contents ranging as high as several moles per kilogram of water. Lower pH fluids are generally more corrosive, and, with pH values which may be as low as 2 to 3, deep downhole fluids may be very corrosive.

In the case of geopressured and geothermal systems, the acid gas content is typically much lower. However, these systems may be characterized by high salinity brines (as much as 150,000 ppm of chloride, for example) and high bottom hole temperatures (up to 310° C.). These fluids may have higher pH values than those estimated for deep sour gas systems, generally in the range of 4 to 5, however higher bottom hole temperatures may increase the potential for corrosion in such systems.

Conditions such as high acid gas (e.g., hydrogen sulfide) concentration, severe scale deposition, ice or hydrate formation, and flow reduction may be inhibited by injection of inhibitors. A challenge to the application of inhibitors is that inhibitors are typically used in small amounts as low as parts per million and care must be taken to adequately introduce the small quantity such that the inhibitor is uniformly dispersed in the fluid to be treated.

Accordingly, there is a need in industry for improved systems and processes for injecting inhibitors into fluids whereby increased process fluid throughput, increased degree of inhibition of undesirable component or condition, and/or the use of reduced amounts of generally costly inhibitor may be achieved.

SUMMARY

A high shear system and process for enhancing inhibitor injection are disclosed. The high shear process may make possible a reduction in mass transfer limitations of conventional inhibitor injection processes, thereby increasing the inhibitor efficiency and potentially enabling a reduction in required amount of inhibitor, an increased elimination/prevention of undesirable components (for example, corrodents, ice, scale), and/or an increase in throughout. The system and process employ an external high shear mechanical reactor to provide enhanced conditions for inhibition. In some embodiments, these conditions result in accelerated chemical reactions between multiphase reactants. In embodiments, these enhanced conditions result in enhanced interaction between liquid components. The high shear device may be an external pressurized high shear device that may permit reduction in the amount of inhibitor required.

A method is provided for introducing inhibitor into a fluid to be treated by forming a dispersion comprising droplets, particles, or gas bubbles of the inhibitor dispersed in a continuous phase of a carrier, wherein the droplets, particles, or gas bubbles have a mean diameter of less than 5 μm, and wherein either the carrier is the fluid to be treated or the method further comprises introducing the dispersion into the fluid to be treated. The inhibitor may be selected from corrosion inhibitors, transport-enhancing inhibitors, scale inhibitors, hydrate inhibitors, ice-formation inhibitors, and combinations thereof. In embodiments, the dispersion is formed from liquid or solid inhibitor. Alternatively, the dispersion is formed from a gaseous inhibitor. Droplets or gas bubbles of inhibitor may have a mean diameter of less than 1 μm, or less than or equal to 400 nm. In embodiments, the fluid to be treated comprises boiler feedwater or a transport stream comprising hydrocarbons. The carrier may comprise at least a portion of the fluid to be treated. The carrier may comprise LPG. Forming the dispersion may comprise subjecting a mixture of the inhibitor and the carrier to a shear rate of greater than about 20,000 s$^{-1}$. Forming the dispersion may comprise contacting the inhibitor and the carrier in a high shear device, wherein the high shear device comprises at least one rotor, and wherein the at least one rotor is rotated at a tip speed of at least 22.9 m/s (4,500 ft/min) during formation of the dispersion. The high shear device may produce a local pressure of at least about 1034.2 MPa (150,000 psi) at the tip of the at least one rotor. In applications, the energy expenditure of the high shear device is greater than 1000 watts per cubic meter of fluid therein during dispersion formation.

Also disclosed is a method for introducing inhibitor into a fluid to be treated by subjecting a fluid mixture comprising inhibitor and a carrier to a shear rate greater than 20,000 $s^{-1}$ in a high shear device to produce a dispersion of inhibitor in a continuous phase of the carrier; wherein either the carrier is the fluid to be treated or the method further comprises introducing the dispersion into the fluid to be treated. The dispersion may comprise particles, droplets, or gas bubbles of inhibitor dispersed in the continuous phase, wherein the average diameter of the droplets, particles, or gas bubbles is less than about 5 µm. The dispersion may be stable for at least about 15 minutes at atmospheric pressure. In some applications, the high shear device comprises at least two generators, each generator comprising a stator and a complementarily-shaped rotor.

Also disclosed is a system for inhibiting a component in a fluid, the system comprising at least one high shear mixing device comprising at least one generator comprising a rotor and a stator separated by a shear gap, wherein the shear gap is the minimum distance between the rotor and the stator, and wherein the high shear mixing device is capable of producing a tip speed of the rotor of greater than 22.9 m/s (4,500 ft/min), and a pump configured for delivering a mixture of a carrier and an inhibitor to the high shear mixing device. The component to be inhibited may be ice, scale, hydrates, acidic chemicals, and combinations thereof. The system may further comprise a flow line or vessel configured for receiving the dispersion from the high shear device. The vessel may be a boiler. The at least one high shear mixing device may be configured for producing a dispersion of the inhibitor in a continuous phase comprising the carrier, wherein the dispersion has a mean bubble, particle, or droplet diameter of less than 5 µm. In applications, the at least one high shear mixing device is capable of producing a tip speed of the rotor of at least 40.1 m/s (7,900 ft/min). The shear gap of the at least one generator may be in the range of from about 0.02 mm to about 5 mm. The at least one high shear device may comprise at least two generators. In applications, the shear rate provided by one generator is greater than the shear rate provided by another generator. The system may comprise at least two high shear mixing devices.

Embodiments of the disclosure pertain to a method for introducing inhibitor into a fluid to be treated that may include forming a dispersion comprising droplets, particles, or gas bubbles of inhibitor dispersed in a continuous phase of a carrier. Forming the dispersion may include subjecting a mixture of the inhibitor and the carrier to a shear rate of greater than about 20,000 $s^{-1}$. The method may include using at least a portion of the dispersion to inhibit corrosion. Using the dispersion to inhibit corrosion may include treating an inner flow line surface. Using the dispersion may also include injecting the dispersion into a geothermal system, wherein the carrier comprises at least a portion of the fluid to be treated.

In some aspects, the droplets, particles, or gas bubbles may have a mean diameter of less than 5 µm, while in other aspects the mean diameter may be less than 1 µm. The dispersion may be formed in a high shear device. In addition, the fluid to be treated may include boiler feedwater or a transport stream comprising hydrocarbons. The method may include injecting the dispersion into a gas well. In some aspects, the dispersion may be formed with a liquid, solid, or gaseous inhibitor.

Forming the dispersion may include contacting the inhibitor and the carrier in a high shear device. The high shear device may have at least one rotor. In some aspects, the at least one rotor may be rotated at a tip speed of at least 22.9 m/s (4,500 ft/min) during forming of the dispersion. In other aspects, the carrier may be LPG. The high shear device may produces a local pressure of at least about 1034.2 MPa (150,000 psi) at the tip of the at least one rotor.

Other embodiments of the disclosure pertain to a method for introducing inhibitor into a fluid to be treated that may include processing a fluid mixture comprising inhibitor and a carrier fluid in a high shear device to produce a dispersion of inhibitor in the carrier fluid; and using the dispersion to inhibit a component selected from the group consisting of ice, scale, hydrates, acidic chemicals, and combinations thereof. Using the dispersion may include treating a surface of a vessel or a flow line.

The dispersion may include particles, droplets, or gas bubbles of inhibitor having an average diameter of the droplets, particles, or gas bubbles less than about 5 µm. The method may include receiving the dispersion into a boiler. The method may include operating the high shear device at a shear rate greater than 20,000 $s^{-1}$.

Yet other embodiments of the disclosure relate to a method for introducing inhibitor into a fluid to be treated that may include forming a dispersion comprising droplets, particles, or gas bubbles of the inhibitor dispersed in a carrier fluid, wherein the droplets, particles, or gas bubbles have a mean diameter of less than 5 µm; subjecting the dispersion to a shear rate greater than 20,000 $s^{-1}$ in a high shear device; and using the dispersion to treat a surface of a flow line or vessel.

In some aspects, the high shear device may include at least one generator having a rotor and a stator separated by a shear gap width that is the minimum distance between the rotor and the stator. The high shear device may be configured to produce a tip speed of the rotor of greater than 22.9 m/s (4,500 ft/min). In other aspects, the high shear device may include a second generator further having a second stator and a second complementarily-shaped rotor. In yet other aspects, the rotor and the stator each comprise grooves disposed in alternating directions The component may be selected from ice, scale, hydrates, acidic chemicals, and combinations thereof, and the vessel may be a boiler. In embodiments, the high shear device may include a second generator further having a second stator and a second complementarily-shaped rotor.

These and other embodiments and potential advantages will be apparent in the following detailed description and drawings.

NOTATION AND NOMENCLATURE

Figure 1:
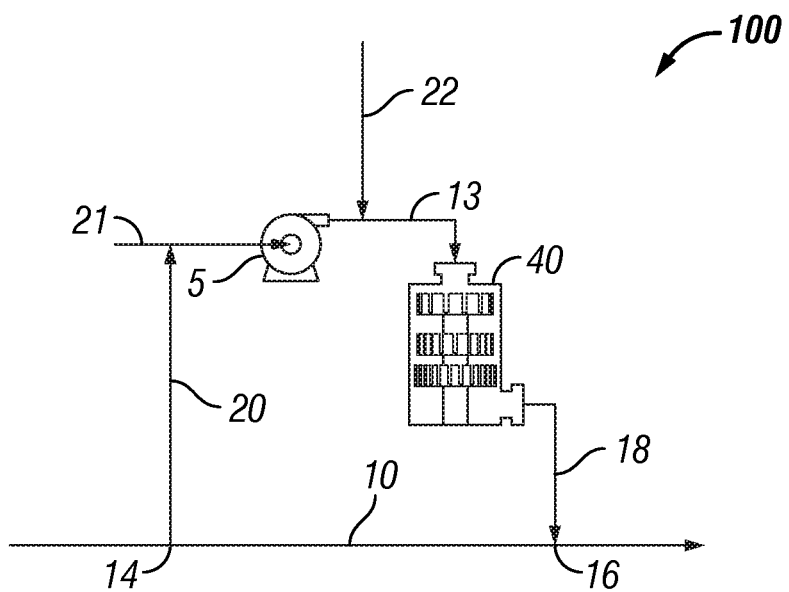
FIG. 1 is a schematic of an inhibitor injection system according to an embodiment of the present disclosure comprising external high shear dispersing.

As used herein, the term "dispersion" refers to a liquefied mixture that contains at least two distinguishable substances (or "phases") that will not readily mix and dissolve together. As used herein, a "dispersion" comprises a "continuous"

phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

The term "inhibitor" is used herein to refer to any chemical compound used to inhibit formation of an undesirable component in a fluid or inhibit an undesirable condition in a flow line or vessel or on a contact surface thereof. For the purposes of this disclosure, the term "inhibitor" includes conventional inhibitors, as well as chemical compounds, such as viscosity reducers, which may prevent an undesirable reduction of flow rate in a flow line.

The term "flow line" is used herein to indicate any vessel or line used to transport, hold, or contact a fluid that contains a component to be inhibited via the inhibitor. The term "flow line" thus encompasses lines such as piping and transport lines and vessels including without limitation boilers, pumps, condensers, reflux drums, and reflux pumps.

DETAILED DESCRIPTION

Overview. The rate of chemical reactions involving liquids, gases and solids depend on time of contact, temperature, and pressure. In cases where it is desirable to react two or more raw materials of different phases (e.g., solid and liquid; liquid and gas; solid, liquid and gas), one of the limiting factors controlling the rate of reaction involves the contact time of the reactants. When reaction rates are accelerated, residence times may be decreased, thereby increasing obtainable throughput. Enhancing contact via the use of high shear may permit increased throughput and/or the use of a decreased amount of generally expensive inhibitor relative to conventional inhibitor injection processes.

Contact time for the reactants is often controlled by mixing which provides contact with two or more reactants involved in a chemical reaction. A system and process for inhibitor injection comprises an external high shear mechanical device to provide rapid contact and mixing of chemical ingredients in a controlled environment in the reactor/mixer device. A reactor assembly that comprises an external high shear device or mixer as described herein may decrease mass transfer limitations, and thereby allow an inhibition reaction to more closely approach kinetic limitations. In embodiments, the high shear device is used to form a dispersion of a gas in a liquid. In other embodiments, the high shear device is used to intimately mix two liquids, for example, hydrocarbon and a liquid inhibitor. In embodiments, the inhibitor is a gas. In embodiments, the inhibitor is a liquid. In applications, the inhibitor is a gas and is injected into a liquid carrier. In alternative applications, the inhibitor is a liquid and is injected into a liquid carrier. In the case of homogeneous reactions, for example liquid/liquid reactions, enhanced mixing may increase the rate of inhibition reaction(s) and may also homogenize the temperature within the reaction zone(s).

The disclosed high shear system and method may be incorporated into conventional inhibitor injection processes, thereby enhancing inhibition of an undesirable component or condition. For example, inhibitors may be added to avoid the production of scale, corrosion (e.g., from hydrogen sulfide, carbon dioxide, etc.), formation of ice, formation of gas hydrates, and the like.

Other uses of the disclosed system and method will become apparent upon reading the disclosure and viewing the accompanying drawings. While the following description will be given with respect to injection of inhibitors via an injection line run alongside a pipeline to permit injection of inhibitors or similar treatments, other embodiments are envisioned. The embodiments described herein are exemplary only, and are not intended to be limiting. For example, the high shear system and process may be used for the injection of disparate types and phases (e.g., gas or liquid) of inhibitors into various flow lines (i.e., lines or vessels).

System for Introduction of Inhibitor.

A high shear inhibitor injection system will now be described in relation to FIG. 1, which is a process flow diagram of an embodiment of a high shear system 100 for introduction of inhibitor into a fluid to be treated. The basic components of a representative system include external high shear mixing device (HSD) 40 and pump 5, and flow line 10. The term "flow line" is used herein to indicate any vessel or line used to transport or hold a fluid that contains a component to be inhibited via the inhibitor. The term "flow line" thus encompasses lines such as piping and transport lines and vessels including without limitation boilers, pumps, condensers, reflux drums, and reflux pumps. As shown in FIG. 1, high shear device 40 is located external to flow line 10. Each of these components is further described in more detail below. Line 21 is connected to pump 5 for introducing carrier fluid into HSD 40. Line 13 connects pump 5 to HSD 40, and line 18 may connect HSD 40 to flow line 10. Line 22 may be connected to line 13 for introducing inhibitor into HSD 40. Alternatively, line 22 may be connected directly to an inlet of HSD 40. Additional components or process steps may be incorporated between flow line 10 and HSD 40, or ahead of pump 5 or HSD 40, if desired, as will become apparent upon reading the description of the high shear inhibitor injection process hereinbelow. For example, line 20 may be connected to line 21 or line 13 from flow line 10, such that fluid in flow line 10 may be used as carrier. Line 20 may be connected to flow line 10 at a location 14 upstream of the position where inhibition is required, for example, upstream of a location at which conditions for scale formation or corrosion are predicted. In embodiments, line 21 and line 20 are a single line connecting flow line 10 and pump 5. Treated fluid may continue along flow line 10 downstream the intersection 16 of line 18 and flow line 10.

High Shear Mixing Device.

External high shear mixing device (HSD) 40, also sometimes referred to as a high shear device or high shear mixing device, is configured for receiving an inlet stream, via line 13, comprising carrier fluid and inhibitor. Alternatively, HSD 40 may be configured for receiving the carrier fluid and the inhibitor via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles or droplets of inhibitor in a continuous phase comprising the carrier flowing through the high shear device. The high shear device comprises an enclosure or housing so that the pressure and temperature of the fluid therein may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.025 mm to 10 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min).

The power consumption may be about 1.5 kW. HSD 40 combines high tip speed with a very small shear gap to produce significant shear on the material being processed. The amount of shear will be dependent on the viscosity of the fluid in HSD 40. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the fluid. In embodiments, the energy expenditure of HSD 40 is greater than 1000 watts per cubic meter of fluid therein. In embodiments, the energy expenditure of HSD 40 is in the range of from about 3000 W/m$^3$ to about 7500 W/m$^3$.

The shear rate is the tip speed divided by the shear gap width (minimal clearance between the rotor and stator). The shear rate generated in HSD 40 may be in the greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$.

HSD 40 is capable of highly dispersing the inhibitor into a continuous phase comprising the carrier, with which it would normally be immiscible. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the fluid therein. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.025 mm (0.001 inch) to about 3 mm (0.125 inch). In certain embodiments, the minimum clearance (shear gap width) between the stator and rotor is about 1.5 mm (0.06 inch). In certain configurations, the minimum clearance (shear gap) between the rotor and stator is at least 1.7 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble or droplet size (e.g., gas bubbles or liquid droplets of inhibitor). In some embodiments, each of the stages is operated with super-fine generator. In some embodiments, at least one of the generator sets has a rotor/stator minimum clearance (shear gap width) of greater than about 5 mm (0.2 inch). In alternative embodiments, at least one of the generator sets has a minimum rotor/stator clearance of greater than about 1.7 mm (0.07 inch).

Figure 2:
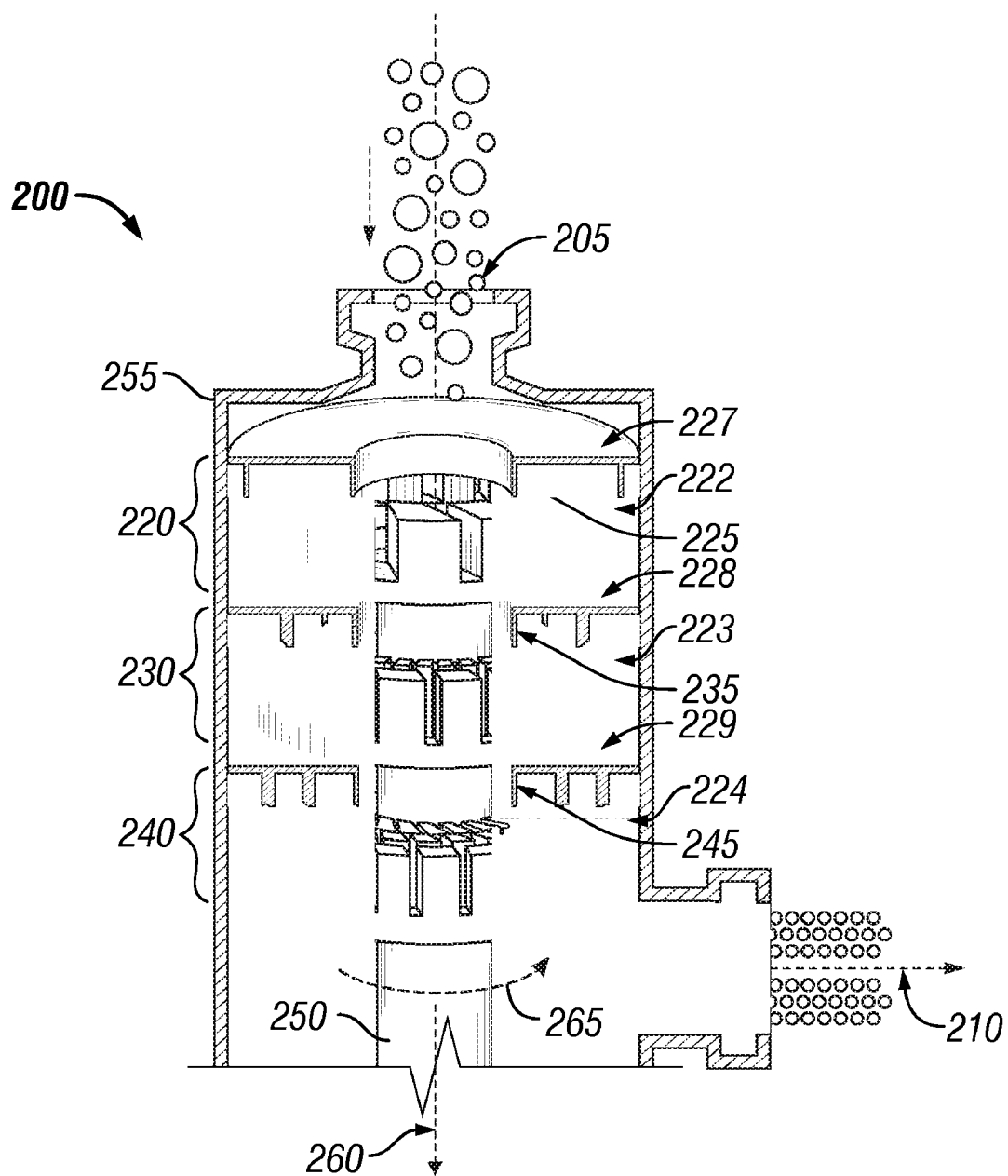
FIG. 2 is a longitudinal cross-section view of a multi-stage high shear device, as employed in an embodiment of the system.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 may be fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm.

High shear device 200 is configured for receiving at inlet 205 a fluid mixture from line 13. The mixture comprises inhibitor as the dispersible phase and carrier fluid as the continuous phase. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion has an average droplet or gas bubble size less than about 5 µm. In embodiments, HSD 40 produces a dispersion having a mean droplet or bubble size of less than about 1.5 µm. In embodiments, HSD 40 produces a dispersion having a mean droplet or bubble size of less than 1 µm; preferably the droplets or bubbles are sub-micron in diameter. In certain instances, the average droplet or bubble size is from about 0.1 µm to about 1.0 µm. In embodiments, HSD 40 produces a dispersion having a mean droplet or bubble size of less than 400 nm. In embodiments, HSD 40 produces a dispersion having a mean droplet or bubble size of less than 100 nm. The dispersion may be capable of remaining dispersed at atmospheric pressure for at least about 15 minutes.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle, droplet or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Flow Line.

Flow line 10 is any line or vessel in which inhibition of an undesirable component or condition is desired. For instance, as indicated in the embodiment of FIG. 1, flow line 10 may be a transport pipeline. Such a pipeline may be used for transport of hydrocarbon streams comprising water and acid gases. In some applications, HSD 40 is positioned inline on flow line 10 such that the entirety of the fluid in flow line 10 is passed through one or more high shear devices. In embodiments, the entirety of the fluid passing through flow line 10 passes through one or more high shear devices operated in series or in parallel. In applications, flow line 10 is a vessel the use of which comprises contact with a fluid comprising an undesirable component or a component which may lead to formation of an undesirable component. For example, flow line 10 may be a boiler, a pump, a reflux drum, a condenser, or another vessel used to process a fluid for which inhibition of an undesirable component or condition is desired.

Inhibition will occur whenever suitable conditions (e.g., time, inhibitor concentration, temperature, pressure, fluid composition) exist. In this sense inhibition could occur at any point in the flow diagram of FIG. 1 if conditions are suitable. For example, injection of dispersion comprising inhibitor into flow line 10 may serve to passivate the surface of flow line 10 such that corrosion is avoided/ameliorated. In applications, the inhibitor interacts with an acid gas component of the fluid or carrier such that corrosion is avoided/ameliorated. In embodiments, inhibitor injection prevents the formation of gas hydrates or ice within flow line 10. In embodiments, the inhibitor serves to inhibit scale formation within flow line 10. In applications, the inhibitor is a viscosity-reducing agent or antifreeze.

Heat Transfer Devices.

Internal or external heat transfer devices for heating the fluid to be treated are also contemplated in variations of the system. For example, the fluid may be heated via any method known to one skilled in the art to help prevent ice or hydrate formation in addition to the use of chemical inhibitor. Some suitable locations for one or more such heat transfer devices are between pump 5 and HSD 40, between HSD 40 and flow line 10, and between flow line 10 and pump 5 when fluid in flow line 10 is used as carrier fluid. Some non-limiting examples of such heat transfer devices are shell, tube, plate, and coil heat exchangers, as are known in the art.

Pumps.

Pump 5 is configured for either continuous or semi-continuous operation, and may be any suitable pumping device that is capable of providing controlled flow through HSD 40 and system 100. In applications pump 5 provides greater than 202.65 kPa (2 atm) pressure or greater than 303.975 kPa (3 atm) pressure. Pump 5 may be a Roper Type 1 gear pump, Roper Pump Company (Commerce Georgia) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pump (not shown) may be included in the system illustrated in FIG. 1. For example, a booster pump, which may be similar to pump 5, may be included between HSD 40 and flow line 10 for boosting the pressure into flow line 10.

Process for Introduction of Inhibitor into a Fluid to be Treated.

Operation of high shear inhibitor injection system 100 will now be discussed with reference to FIG. 1. In operation for the introduction of an inhibitor into a fluid, an inhibitor to be dispersed is introduced into system 100 via line 22, and combined in line 13 (or within HSD 40) with a fluid carrier.

The carrier may be the fluid to be treated or may be another fluid utilized to form the dispersion with the inhibitor which is subsequently injected into the fluid to be treated, for example, via injection into flow line 10 through which the fluid to be treated flows. The carrier may be a liquid or a gas. In embodiments, the carrier is a portion of the fluid to be treated. In embodiments, the carrier comprises liquid hydrocarbon. In embodiments, the carrier comprises LPG.

The inhibitor may be a gas or a liquid. In embodiments, inhibitor in line 22 comprises an inhibitor effective for inhibiting the production of an undesirable component selected from ice, acidic components, scale, or flow reducers. In embodiments, the inhibitor is a corrosion inhibitor and interacts with acidic components of the fluid to be treated or a contact surface (e.g., interior wall) of flow line 10 such that corrosion of flow line 10 is minimized or prevented. Inhibitor may comprise corrosion inhibitor effective for preventing/reducing corrosion of flow lines 10 due to a corrodent in a fluid that the flow line contacts. For example, when flow line 10 carries a hydrocarbon fluid comprising acid gas corrodents such as carbon dioxide, hydrogen sulfide, and/or hydrogen chloride in the presence of water, inhibitor 22 may be added to the fluid to inhibit corrosion.

Generally, a corrosion inhibitor is a chemical compound that, when added in small concentration, stops or slows down corrosion of metals and alloys. A desirable inhibitor may be selected as known to those of skill in the art. The inhibitors generally are applied in very small amounts, usually below 100 ppm, and more particularly in the range of from 5 to about 50 ppm. A good corrosion inhibitor may provide 95% inhibition at concentrations of 80 ppm, and 90% inhibition at concentrations of 40 ppm. The corrosion inhibitor may function by effecting formation of a thin film or passivation layer on a contact surface of flow line 10. This passivation layer may prevent access of the corrosive substance to the material of the contact surface (e.g., metal). The so called "passivating" inhibitors (e.g., chromate) are frequently effective under very extreme conditions. In embodiments, the disclosed system and method are used to protect drill pipe through which drilling fluids containing the corrodents are passed. In such embodiments, at least a portion of the carrier in line 21 may comprise the fluid to be treated. The corrosion inhibitor may inhibit either oxidation or reduction of the redox corrosion system (anodic and cathodic inhibitors). The corrosion inhibitor may scavenge dissolved oxygen. In applications, the corrosion inhibitor may provide a combination of two or more of these protection mechanisms.

The corrosive component of the fluid to be treated may be one or more of hydrogen sulfide, carbon dioxide, and sodium chloride. In embodiments, corrosion inhibitor in line 22 comprises hexamine, phenylenediamine, dimethylethanolamine, sodium nitrite, cinnamaldehyde, condensation products of aldehydes and amines (imines), chromates, nitrites, phosphates, hydrazine, ascorbic acid, and combinations thereof. The suitability of any given inhibitor for a certain application depends on the material of the contact surfaces, the nature of the corrodents and other components of the fluid into which the inhibitors are added, and the operating temperature.

In embodiments, the high shear system and method are used to ameliorate reactive sulfur corrosion (e.g., from hydrogen sulfide), which may occur in either the liquid or vapor phase. In embodiments, high shear system 100 is used to ameliorate naphthenic acid corrosion which tends to occur in liquid and in condensate phases and may be enhanced in high velocity regions.

U.S. Pat. No. 5,961,885 describes a corrosion inhibitor comprising a dispersant, an imidazoline, an amide, an alkyl pyridine and a heavy aromatic solvent. The resultant blend effectively inhibits corrosion of flow lines containing low pH mixtures of hydrocarbons, water, and acid gases. In an embodiment, the inhibitor in line 22 is a corrosion inhibitor as described in U.S. Pat. No. 5,961,885 comprising a dispersant, an imidazoline, an amide, an alkyl pyridine and a heavy aromatic solvent.

U.S. Pat. No. 5,188,179 describes methods for inhibiting corrosion in oil field pipe by continuously bringing reactants together in a fluid passing through the pipe to form a precipitated film of iron disulfide on the interior wall of the pipe as an amorphous corrosion inhibiting coating which is continuously being removed away and also being continuously replenished by the continuing reaction of the reactants. The corrosion inhibiting film which is formed is a precipitate film formed by the reaction of a polysulfide with ferrous iron. The ferrous iron may be a constituent of the fluid to be treated or separately introduced. The polysulfide is the reaction product of hydrogen sulfide as a constituent existing in the passing fluid and an oxidizing agent such as ammonium nitrate which is separately introduced into the passing fluid. In embodiments, the inhibitor is a corrosion inhibitor comprising an oxidizing agent which reacts with hydrogen sulfide in the carrier or corrosive fluid to be treated to produce a polysulfide which then reacts with ferrous iron in the fluid to be treated to precipitate a corrosion inhibiting film on a contact surface of flow line 10.

The inhibitor may be a scale inhibitor which inhibits production of scale in flow line 10. Scale deposits can occur in brine when the solubility of the inorganic species in the brine decreases due to changes in the pressure and/or temperature or upon mixing of incompatible waters. Primary scales include sulfates ($BaSO_4$, $CaSO_4$, $SrSO_4$) and carbonates ($CaCO_3$, $MgCO_3$, $FeCO_3$). Carbonates can form in a transport line due to reduction of the system pressure, which reduces the amount of carbon dioxide solubilized in the brine. Sulfates can form due to mixing of incompatible brines (seawater and formation brine) or reduction of temperature, for example seawater injection into a formation with barium.

Scale inhibitors may be selected from sulfonated compounds, polymer based inhibitors and phosphonates. In embodiments, the inhibitor may comprise phosphine-polycarboxylate acid (PPCA) for the inhibition of scale production. Typical dosage of scale inhibitor is about 5-100 ppm.

In embodiments, high shear system 100 is utilized for scale control in, for example, a transport flow line 10. Inhibitor may be injected upstream of the point of scale risk. In embodiments, the injection of scale inhibitor into flow line 10 via high shear device 40 is before or while the fluid is downhole. In embodiments, the injection of scale inhibitor into flow line 10 is into or upstream a wax eater unit.

Inhibitor may be a hydrate inhibitor which minimizes or prevents production of hydrates (e.g., gas hydrates) in flow line 10. The inhibitor may be an ice inhibitor, such as antifreeze which prevents/minimizes production of ice and flow reduction in flow line 10. The inhibitor may be a viscosity reducer, which helps maintain flow within flow line 10.

The concentration of inhibitor will normally be correlated with the concentration of reactant components in the fluid volume to be treated, for example, the concentration of acidic components in the fluid in flow line 10. Inhibitor in line 22 is intimately mixed, via high shear device 40, with carrier in line 21. In applications, carrier in line 21 comprises a slipstream drawn from flow line 10. In such instance, the carrier is the same fluid as the fluid to be treated (e.g., line 21 and line 20 may be a single line). In alternative embodiments, the entirety of fluid in flow line 10 is sent through one or more high shear mixers, in series or in parallel, to intimately mix the contents of flow line 10 with inhibitor.

In embodiments, the inhibitor is fed directly into HSD 40, instead of being combined with the carrier in line 13. Pump 5 may be operated to pump the carrier through line 21, providing a controlled flow throughout high shear device (HSD) 40 and high shear system 100. Pump 5 may build pressure and feed HSD 40. In some embodiments, pump 5 increases the pressure of the HSD inlet stream in line 13 to greater than 200 kPa (2 atm) or greater than about 300 kPa (3 atmospheres). In this way, high shear system 100 may combine high shear with pressure to enhance reactant intimate mixing.

After pumping, the inhibitor and carrier are mixed within HSD 40, which serves to create a fine dispersion of the inhibitor in the carrier fluid. In HSD 40, the inhibitor and carrier are highly dispersed such that nanobububbles, submicron-sized bubbles, and/or microbubbles of gaseous inhibitor or nanodroplets, submicron-sized droplets, and/or microdroplets of liquid inhibitor are formed for superior dissolution into solution and enhancement of fluid mixing. For example, disperser IKA® model DR 2000/4, a high shear, three stage dispersing device configured with three rotors in combination with stators, aligned in series, may be used to create the dispersion of inhibitor in fluid carrier. The rotor/stator sets may be configured as illustrated in FIG. 2, for example. The combined mixture of inhibitor and carrier may enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble or droplet-size dispersion emerging from the second stage enters the third stage rotor/stator combination, which may comprise a rotor and a stator having rotor teeth and stator teeth, respectively. The dispersion exits the high shear device via line 18. In some embodiments, the shear rate increases stepwise longitudinally along the direction of the flow, 260.

For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If HSD 40 includes a PTFE seal, the seal may be cooled using any suitable technique that is known in the art. For example, carrier in line 21, fluid mixture in line 13, or fluid in flow line 10 may be used to cool the seal and in so doing be preheated prior to entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the inhibitor and the carrier fluid. In some embodiments of the process, the transport resistance is reduced by operation of the high shear device such that the velocity of the reaction is increased by greater than about 5%. In some embodiments of the process, the transport resistance is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed fluid is in excess of 500° C. and at pressures in excess of 500 kg/cm$^2$ under cavitation conditions. The high shear mixing results in dispersion of the inhibitor in micron or submicron-sized bubbles or droplets. In some embodiments, the resultant dispersion has an average bubble or droplet size less than about 1.5 μm. Accordingly, the dispersion exiting HSD 40 via line 18 comprises micron and/or submicron-sized droplets or gas bubbles. In some embodiments, the mean bubble or droplet size is in the range of about 0.4 μm to about 1.5 μm. In some embodiments, the resultant dispersion has an average bubble or droplet size less than 1 μm. In some embodiments, the mean bubble or droplet size is less than about 400 nm, and may be about 100 nm in some cases. In many embodiments, the dispersion is able to remain dispersed at atmospheric pressure for at least 15 minutes.

Once dispersed, the resulting gas/liquid or liquid/liquid dispersion exits HSD 40 via line 18 and feeds into flow line 10, as illustrated in FIG. 1. The contents of flow line 10 may be maintained at a specified reaction temperature using heating and/or cooling capabilities (e.g., heaters) and temperature measurement instrumentation. Pressure in the flow line may be monitored using suitable pressure measurement instrumentation, employing techniques that are known to those of skill in the art.

Conditions of temperature, pressure, space velocity and inhibitor injection per volume of fluid to be treated may be calculated as known to those of skill in the art. The use of high shear device 40 may allow for better interaction and more uniform mixing of the inhibitor with the fluid to be treated and may therefore permit a reduction in the amount of inhibitor utilized, and/or an increase in possible throughout. In some embodiments, the operating conditions of system 100 comprise a temperature of at or near ambient temperature. In embodiments, flow line 10 is operated at or near atmospheric pressure.

Optionally, the product dispersion in line 18 may be further processed prior to entering flow line 10, if desired. In flow line 10, inhibition of undesirable component or condition occurs or continues. For example, if inhibitor in line 22 is corrosion inhibitor, passivation of surfaces within flow line 10 may occur. In embodiments, the injection of dispersion in line 18 into flow line 10 prevents ice formation, flow reduction, or scaling within flow line 10, as discussed hereinabove. Fluid in line 10 downstream of injection location 16 having been treated with inhibitor may proceed to flow along flow line 10.

Multiple Pass Operation.

In the embodiment shown in FIG. 1, the system is configured for single pass operation, wherein the treated fluid beyond injection point 16 in line 10 continues along flow line 10. In some embodiments, flow line 10 may comprise a vessel, such as a boiler. In such embodiments, it may be desirable to pass the contents of flow line 10, or a liquid fraction thereof, through HSD 40 during a second pass. In this case, at least a portion of the contents of flow line 10 may be recycled from flow line 10 and pumped by pump 5 into line 13 and thence into HSD 40. Additional inhibitor may be injected via line 22 into line 13, or it may be added directly into the high shear device (not shown). In other embodiments, product stream beyond injection location 16 may be further treated prior to a portion thereof being recycled to high shear device 40.

Multiple High Shear Mixing Devices.

In some embodiments, two or more high shear devices like HSD 40, or configured differently, are aligned in series, and are used to further inhibit an undesirable component or condition. In embodiments, a plurality of high shear mixers is positioned along a transport or process flow line 10, whereby inhibitor is added at many locations 16 along the line via multiple high shear mixers. Operation of the mixers may be in either batch or continuous mode. In some instances in which a single pass or "once through" process is desired, the use of multiple high shear devices in series may also be advantageous. For examples, in embodiments, the entirety of the fluid flow in flow line 10 is passed through multiple high shear devices 40 in serial or parallel flow such that all of the fluid in flow line 10 is contacted with inhibitor via high shear. For example, in embodiments, outlet dispersion in line 18 is fed into a second high shear device. When multiple high shear devices 40 are operated in series, additional inhibitor may be injected into the inlet feedstream of each device. In some embodiments, multiple high shear devices 40 are operated in parallel, and the outlet dispersions therefrom are introduced into one or more flow lines 10.

Features.

The increased surface area of the micrometer sized and/or submicrometer sized inhibitor droplets or gas bubbles in the dispersion in line 18 produced within high shear device 40 may result in faster and/or more complete inhibition of undesirable conditions or components within flow line 10.

While the description has been given with respect to a system incorporating inhibitor injection into a pipeline, it is to be understood that the disclosed system and method are applicable to the injection of various inhibitors, including, but not limited to, inhibitors for the reduction of scale production, inhibitor for the prevention of gas hydrate formation, inhibitors for prevention of corrosion, injections of materials for enhancing the flow of transport streams, for example, antifreeze, viscosity-reducers, and combinations thereof. The inhibitor may be added as a solid, a liquid, or a gas and may be mixed with a liquid or a gas carrier. For example, solid inhibitor in line 22 may be added to high shear device 40 where it is intimately mixed with carrier fluid introduced via line 21.

In embodiments, use of the disclosed process comprising reactant mixing via external high shear device 40 allows use of reduced quantities of inhibitor than conventional inhibition and/or increases the degree of inhibition. In embodiments, the method comprises incorporating external high shear device 40 into an established process thereby reducing the amount of inhibitor required to effect inhibition and/or enabling the increase in production throughput from a process operated without high shear device 40. In embodiments, the disclosed method reduces operating costs/increases production from an existing process. Alternatively, the disclosed method may reduce capital costs for the design of new processes.

Without wishing to be limited to a particular theory, it is believed that the level or degree of high shear mixing may be sufficient to increase rates of mass transfer and also produce localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods induces cavitation whereby inhibitor and/or carrier fluid are dissociated into free radicals, which then react to provide inhibition of undesirable components of a fluid or undesirable conditions in a flow line 10.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for introducing inhibitor into a fluid to be treated, the method comprising:
    forming a dispersion comprising droplets, particles, or gas bubbles of inhibitor dispersed in a continuous phase of a carrier, wherein forming the dispersion comprises subjecting a mixture of the inhibitor and the carrier to a shear rate of greater than about 20,000 $s^{-1}$ in a high shear device comprising at least one generator comprising a rotor and a complementarily-shaped stator, wherein the rotor and the stator each comprise grooves, wherein the grooves of the rotor and the grooves of the stator of each generator are disposed in alternating directions; and
    using at least a portion of the dispersion to inhibit corrosion.

2. The method of claim 1, wherein the droplets, particles, or gas bubbles have a mean diameter of less than 5 μm, and wherein the dispersion is formed in a high shear device.

3. The method of claim 2, wherein the mean diameter is less than 1 μm.

4. The method of claim 2, wherein the fluid to be treated comprises boiler feedwater or a transport stream comprising hydrocarbons.

5. The method of claim 1, wherein using at least a portion of the dispersion to inhibit corrosion further comprises injecting the dispersion into a gas well, wherein the dispersion is formed from a liquid or solid inhibitor.

6. The method of claim 1, wherein the dispersion is formed from a gaseous inhibitor.

7. The method of claim 1, wherein using the dispersion to inhibit corrosion further comprises treating an inner flow line surface.

8. The method of claim 1, wherein using at least a portion of the dispersion to inhibit corrosion further comprises injecting the dispersion into a geothermal system, and wherein the carrier comprises at least a portion of the fluid to be treated.

9. The method of claim 1, wherein forming the dispersion further comprises rotating the at least one rotor at a tip speed of at least 22.9 m/s (4,500 ft/min).

10. The method of claim 9, wherein the carrier is LPG, and wherein the high shear device produces a local pressure of at least about 1034.2 MPa (150,000 psi) at the tip of the at least one rotor.

11. A method for introducing inhibitor into a fluid to be treated, the method comprising:
    processing a fluid mixture comprising inhibitor and a carrier fluid in a high shear device to produce a dispersion of inhibitor in the carrier fluid, wherein the high shear device comprises at least one generator comprising a rotor and a complementarily-shaped stator, and wherein the rotor and the stator of each of the at least one generators each comprise grooves, wherein the grooves of the rotor and the grooves of the stator of each generator are disposed in alternating directions; and
    using the dispersion to inhibit a component selected from the group consisting of ice, scale, hydrates, acidic chemicals, and combinations thereof.

12. The method of claim 11, the method comprising operating the high shear device at a shear rate greater than 20,000 $s^{-1}$.

13. The method of claim 11, wherein using the dispersion comprises treating a surface of a vessel or a flow line, wherein the dispersion comprises particles, droplets, or gas bubbles of inhibitor having an average diameter of the droplets, particles, or gas bubbles less than about 5 μm.

14. The method of claim 13, wherein the vessel is a boiler.

15. A method for introducing inhibitor into a fluid to be treated, the method comprising:

forming a dispersion comprising droplets, particles, or gas bubbles of the inhibitor dispersed in a carrier fluid, wherein the droplets, particles, or gas bubbles have a mean diameter of less than 5 µm;

subjecting the dispersion to a shear rate greater than 20,000 $s^{-1}$ in a high shear device, wherein the high shear device comprises at least one generator comprising a rotor and a complementarily-shaped stator, wherein the rotor and the stator of each of the at least one generators each comprise grooves, and wherein the grooves of the rotor and the grooves of the stator of each generator are disposed in alternating directions; and using the dispersion to treat a surface of a flow line or vessel.

16. The method of claim 15, wherein the rotor and the stator of each of the at least one generators are separated by a shear gap width that is the minimum distance between the rotor and the stator, and wherein the high shear device is configured to produce a tip speed of the rotor of greater than 22.9 m/s (4,500 ft/min).

17. The method of claim 16, wherein the high shear device comprises at least two generators.

* * * * *